United States Patent [19]

Sbaschnigg et al.

[11] Patent Number: 4,874,468
[45] Date of Patent: Oct. 17, 1989

[54] APPARATUS FOR THE LIQUID TREATMENT OF A FIBROUS BOARD BETWEEN TWO ENDLESS FORAMINOUS BELTS OR WIRES

[75] Inventors: Johann Sbaschnigg, Graz; Franz Petschauer, Lannach, both of Austria

[73] Assignee: Maschinenfabrik Andritz Actiengesellschaft, Graz, Australia

[21] Appl. No.: 262,255

[22] Filed: Oct. 20, 1988

Related U.S. Application Data

[63] Continuation of Ser. No. 7,080, Jan. 27, 1987, abandoned.

[30] Foreign Application Priority Data

Feb. 18, 1986 [AT] Austria ............................. A 417/86

[51] Int. Cl.⁴ .............................................. D21C 9/02
[52] U.S. Cl. ............................... 162/300; 68/181 R; 162/60; 162/311; 210/400; 210/401
[58] Field of Search ................... 162/60, 300, 301, 308, 162/311; 68/44, 181 R, 205 R; 210/400, 401; 8/156

[56] References Cited

U.S. PATENT DOCUMENTS

| | | | |
|---|---|---|---|
| 2,356,285 | 8/1944 | Street | 162/301 |
| 2,881,676 | 4/1959 | Thomas | 162/301 |
| 3,938,206 | 2/1976 | Stranger-Johannesson | 162/60 |
| 4,292,123 | 9/1981 | Linturen et al. | 162/60 |
| 4,481,118 | 11/1984 | Heissenberger et al. | 210/400 |
| 4,549,415 | 10/1985 | Justus | 162/60 |
| 4,664,749 | 5/1987 | Hoopamaki et al. | 162/60 |

Primary Examiner—Karen Hastings
Attorney, Agent, or Firm—Townsend & Townsend

[57] ABSTRACT

The invention relates to an apparatus or plant or arrangement for the treatment of a dilute suspension of fibers or layer of material passed between two endless foraminous belts or wires or the like conveying means, the forming fibrous board being made to pass between the foraminous belts along at least one container for a treatment medium and at least some of the treatment containers being provided with a wall having orifices on the side facing the fibrous board for generating a pressure difference on the same, but being otherwise closed against the environment, and/or at least some of the treatment containers closed against the environment having walls closed against the foraminous belts and thus against the fibrous board, but otherwise open towards the foraminous belts. According to the invention, a reduction of the energy requirement in the displacement washing of filter cakes is sought above all. This is achieved according to the invention in that in particular for countercurrent treatment, conveniently for countercurrent displacement washing, at least one treatment container arranged above the upper framinous belt, in particular in contact with said belt, is formed as a pressure container from which the treatment liquid is dispensed under superpressure to the foraminous belts or to the forming fibrous board or layer of material present therebetween, and further by providing for a pressureless collecting container or pressureless collecting containers to be provided opposite this or these pressure container(s) underneath the lower foraminous belt.

16 Claims, 2 Drawing Sheets

APPARATUS FOR THE LIQUID TREATMENT OF A FIBROUS BOARD BETWEEN TWO ENDLESS FORAMINOUS BELTS OR WIRES

This is a continuation of application Ser. No. 07/007,080, filed Jan. 27, 1987, now abandoned.

The invention relates to an apparatus or plant or arrangement for the treatment of a dilute suspension of fibers or layer of material passed between two endless foraminous belts or wires or the like conveying means, in particular for the displacement washing of a filter cake, the forming fibrous board being made to pass, conveniently after passing a pressure zone, advantageously a wedge zone, on at least one container for a treatment medium, for instance a wash liquid, a bleaching agent or other chemicals, whereupon the fibrous board is optionally passed to a pressing zone, at least some of the treatment containers being provided with a wall having orifices on the side facing the board for generating a pressure difference on the same, but being otherwise closed against the environment and/or at least some of the treatment containers closed against the environment having walls closed against the foraminous belts and thus against the fibrous board, but otherwise open towards the foraminous belts, said containers optionally being arranged in series and connected with inlets and outlets of various treatment media, for instance water and/or bleaching chemicals, possibly with various parameters or state variables, for instance various concentrations or various pressures.

The term "fibrous board" as used herein is intended to designate a dilute suspension of fibers of which a board or mat or layer of material or pulp is formed in the course of the treatment according to the invention.

An apparatus of this type is known from U.S. Pat. No. 2,356,285, which describes containers for wash liquid open on the bottom and located above the fibrous board and suction boxes provided underneath the board and the foraminous belts. Maintaining the vacuum requires considerable expenditure, particularly in respect of energy consumption.

According to the invention, this disadvantage is avoided, based on the apparatus initially described, by providing, in particular for countercurrent treatment, conveniently for countercurrent displacement washing, at least one treatment container arranged above the upper foraminous belt or wire, in particular in contact with said belt, to be formed as a pressure container from which the treatment liquid is dispensed under superpressure to the foraminous belts or wires and to the fibrous board or pulp lodged therebetween and further by providing for a pressureless collecting container or pressureless collecting containers to be provided opposite this or these pressure container(s) underneath the lower foraminous belt or wire. The apparatus according to the invention permits a considerable treatment effect, in particular washing effect, at comparatively low energy requirement. The combination according to the invention of a pressure zone above the dilute suspension of fibers with a zone of normal ambient pressure underneath the fibrous pulp assures the pressure gradient required for an excellent washing effect in a particularly economic manner. Superpressure is much easier to generate and to maintain than the vacuum according to U.S. Pat. No. 2,356,285.

An additional essential improvement can be obtained by arranging at least two treatment containers immediately side by side and in close contact with the foraminous belts or wires, with the faces of the treatment containers establishing this contact, as far as they are located on the same side of the fibrous board, continuously merging with one another and thus generating guiding surfaces of the belts and fibrous board, conveniently forming a continuously curved belt contact surface of identical radii of curvature.

In contrast to this, the treatment containers according to U.S. Pat. No. 2,356,285 are not only formed as suction boxes, but are further separated by guiding rollers and thus located at a considerable distance from one another, so that they cannot form a continuous guide means for the belt or wire. Moreover, not only the energy requirement already mentioned, but also the requirement in space and material of the prior art apparatus is higher than that according to the invention. Added to this is the fact that according to the invention, a particularly uniform application of the treatment liquid and a particularly concentrated and effective treatment operation, in particular washing operation, is achieved, enhanced by the treatment liquid supplied under pressure from above, but also by the extended contact surface and in particular by the continuously curved contact surface preferred according to the invention. The continuously curved contact surface prevents a lifting of the fibrous board with the foraminous belts or wires from the treatment containers, which additionally enhances the treatment or washing operation.

An arrangement particularly useful in practice is achieved in a further development of the invention by treatment containers formed as collecting containers which are open, i.e. not sealed against super-pressure, being associated with the pressure containers on the side opposite the fibrous board, the treatment containers opposite to one another in relation to the fibrous board viewed in the moving direction of the foraminous belts or wires and also transversely thereto having essentially identical dimensions of the horizontal cross sections and the walls of the treatment containers positioned underneath the belts or wires being arranged as accurately as possible perpendicular underneath the corresponding walls of the treatment containers positioned opposite above the foraminous belts, thus aligned with them.

The sealing abutment of the pressure containers on the foraminous belts can be improved according to the invention, depending on the type or conditions of operation, by providing for the pressure containers to be adjustable, in particular transversely in relation to the surface of the foraminous belts or wires. A considerable additional improvement may be obtained according to the invention by conveniently providing for the underside of the pressure containers having orifices and facing the foraminous belts to be formed convexly for improving the sealing effect between treatment containers and abutting foraminous belt, with the radii of curvature of the undersides of the individual treatment containers facing the formaminous belts or wires—viewed in a longitudinal plane extending through the belts—being identical or different and with these sides of adjacent treatment containers continuously merging with one another at increasing or decreasing radii of curvature, and further conveniently forming the radii of curvature so as to minimize the friction between the treatment containers and the abutting foraminous belts or wires. Under certain conditions, however, apparatus according to the invention may be of advantage wherein the undersides of the pressure containers provided with orifices and facing the belts are formed concavely so as to assure a tight abutment. If it is intended or preferred for the side of the pressure containers facing the foraminous belts to be flat (plane), it is convenient for adjustable, perforated pressure plates to be associated with said containers on the side opposite the dilute aqueous suspension of fibers for the purpose of tightly pressing the foraminous belts or wires and the fibrous board against the pressure containers provided on the other side of the fibrous board, with the face of said pressure plates facing the fibrous board being formed flat or plane.

The invention is explained in detail under reference to the following exemplary embodiments.

DETAILED DESCRIPTION

Figure 1:
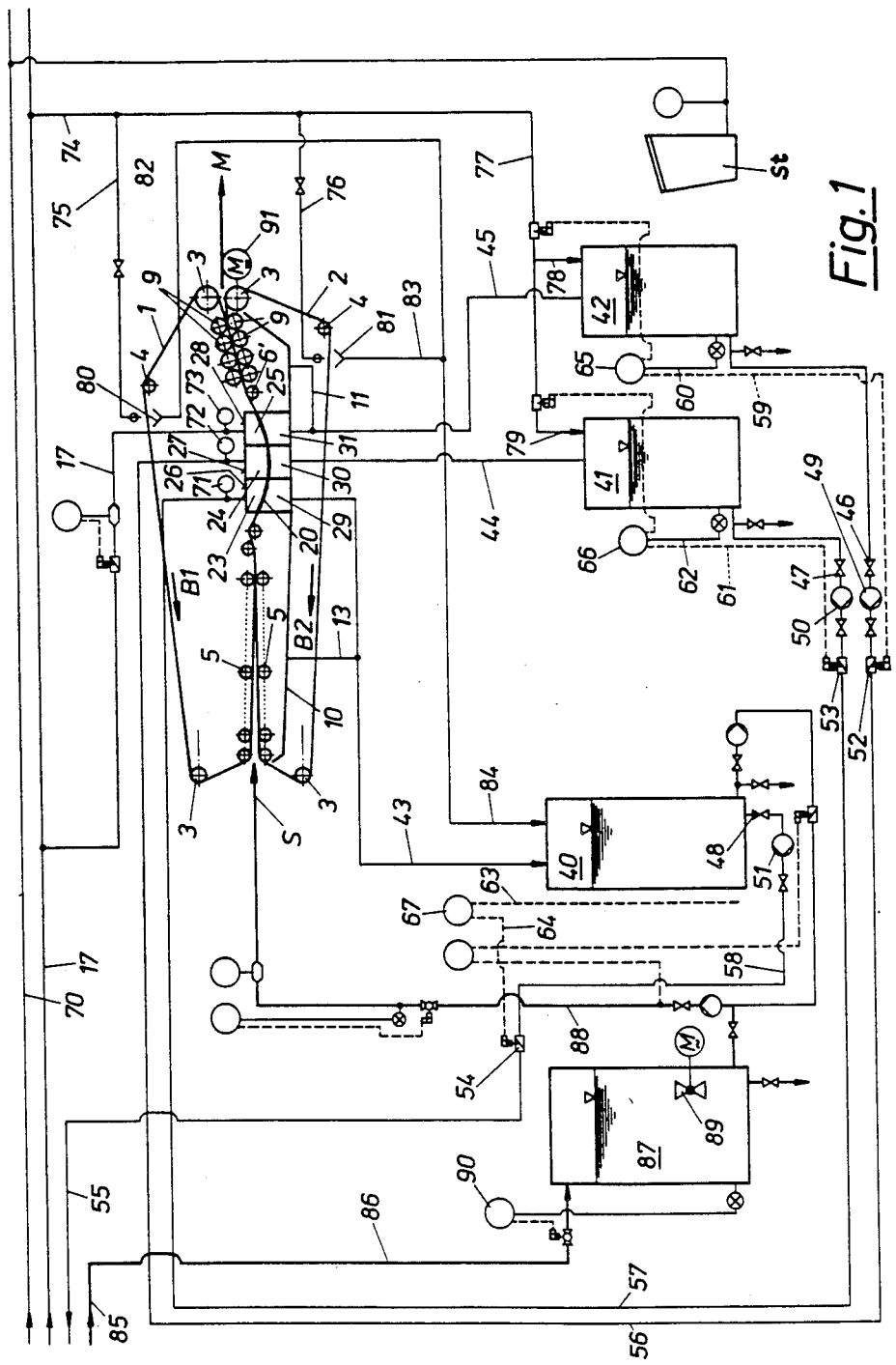
FIG. 1 schematically shows a twin-wire press having three pressure chambers.

In the twin-wire press according to FIG. 1, the upper foraminous belt 1 is wound over a plurality of rollers; the lower foraminous belt 2 is guided in a similar manner. Deflection rollers 3 are provided on the ends of the belts. Belt or wire tension rollers 4 serve for tensioning the foraminous belts. The moving direction of the foraminous belts or wires is indicated by arrows B1 and B2. After the inlet S for the dilute aqueous suspension of fibers, a plurality of pairs of pressure rollers 5 of progressively decreasing axial distance is provided, thus forming a wedge zone. This wedge zone can also be formed by pressure plates. Deflection rollers 6 are provided at the end of the wedge zone. An S-shaped zone, i.e. pressure rollers, through which the foraminous belts or wires 1, 2 and the filter cake present therebetween are subjected to an S-shaped deflection, can be provided instead of, behind these or on the side of said rollers.

Figure 2:
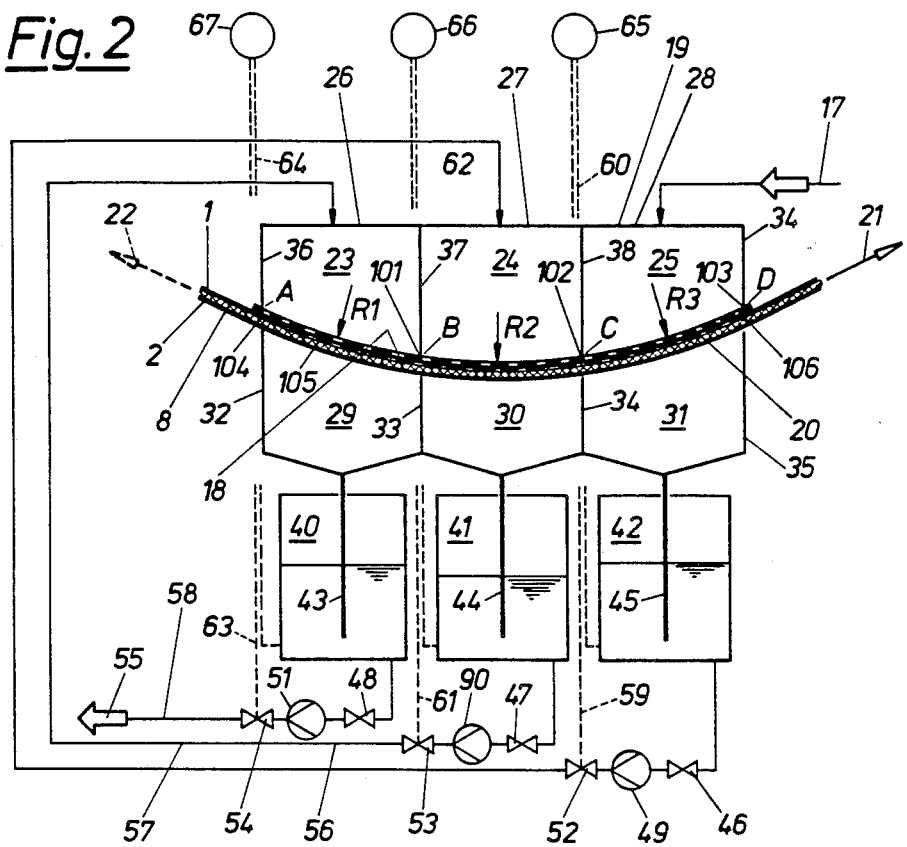
FIG. 2 shows a detail in enlarged scale in schematic longitudinal cross section along the median line of the foraminous belts or wires of a displacement washing apparatus in the pressure chamber area, the detailed representation according to FIG. 2 showing some modifications as compared to the total representation according to FIG. 1.

As shown in enlarged scale in FIG. 2, the foraminous belts or wires 1, 2 with the filter cake 8 present therebetween are then passed along a treatment container or washing shoe 19 into which, here through line 17, wash water is fed under pressure or superpressure and pressed through the filter cake 8 through a plurality of orifices, for instance bores 18 or slots. This permits a genuine displacement washing, also in the countercurrent process. The relation between length and width of the container can vary, for instance, between 1:2 and 1:3, in particular as a function of the type of material, the type and amount of wash liquid, the moving rate of the foraminous belts or wires and the thickness of the fibrous board. The width of the container depends, above all, on the width of the apparatus, so that for instance, working widths of 800 to 4800 mm may conveniently be provided. A moving rate of the belts or wires of about 20 m/min is possible. In this case, the underside or belt contact face 20 of the container 19 shows an arcuate curve so that the wash water is applied uniformly and the fibrous board with the foraminous belt does not lift off. The track of the foraminous belts for the washing operation is of considerable length, thus assuring an effective washing operation. It is essential that the dissolved chemicals be washed out or removed from the filter cake or introduced into it to the greatest extent possible.

As particularly shown in FIG. 2, the washing operation, which is preferably performed as a countercurrent washing (running direction of the foraminous belts: arrows B1, B2 or 21), but also as a uniflow current washing (running direction: arrow 22 (FIG. 2)), is accomplished, for instance, in three stages, 23 to 25, according to the invention, the treatment container 19 is provided for this purpose with three closed pressure chambers or pressure zones 26 to 28 separated from one another. Below these pressure chambers, filtrate vats 29 to 31 whose walls 32 to 35 can be aligned with the walls 36 to 39 of the pressure chambers are provided, so that in the schematic representation of FIG. 2, the walls 32, 36 and 33, 37 extend precisely on the same perpendicular. This may also apply to the lateral walls of the pressure chambers and the filtrate vats which may be arranged parallel in relation to the moving direction of the foraminous belts or wires. Between the front faces 100 to 103 of the walls facing the forming board of fibrous material or pulp or the conveying means, in particular the foraminous belts or wires 1,2, and the, in particular perforated, contact wall facing the conveying means, for instance the underside 20 of the pressure chambers 26 to 28 and the next closest conveying means, for instance the next closest belt or wire, seals 104 to 106 constituting a lateral closing of the interior of the pressure chambers 26 to 28 towards the outside and thus assuring the build-up of a superpressure in the pressure chamber, are provided. The seals 103 are provided on the rear and front faces of the pressure chambers on the upper foraminous belt 1. The vats 29 to 31 are open, thus not sealed against the lower belt or wire 2, so that they are under normal atmospheric pressure. The pressure difference on the forming board of fibrous material is a function of, among others, the type and thickness of fibrous material, the moving rate of the belt and the type and amount of wash liquid. It was found in practice that pressure differences within the range of 0.1 to 0.5 bar, in particular 0.2 to 0.3 bar, are favorable.

The filtrate is then further conveyed to the filtrate containers 40 to 42 via pipes 43 to 45 or the like. FIG. 2 shows open containers with inlet pipes 43 and 45 terminating close to their bottoms. The filtrate is then conveyed via valves 46 to 48 by means of pumps 49 to 51 via control valves 52 to 54 either to an adjacent or preceding (in countercurrent displacement washing) pressure chamber 24 or 23 or the outlet 55 of the treatment medium from the system via the lines 56 to 58. The metering of the volume of medium conveyed can be influenced, for instance, by means of the control valves 52 to 54 which are connected via lines 59, 60 and 61, 62 and 63, 64 with the level controls 65 to 67.

The radii $R_1$, $R_2$ and $R_3$ of the underside 20 of the pressure container or washing shoe 19 in the individual pressure chambers or zones 26 to 28 can be identical, but also different, a continuous transition of the contact faces with the foraminous belts or wires from pressure chamber to pressure chamber being desirable in order to assure the proper sliding of the foraminous belts with the filter cake present therebetween along the treatment container 19. The radii $R_1$ to $R_3$ can thus be increased or decreased, depending on the requirements, although care must be taken to assure a smooth, continuous transition at the pressure chamber borders.

Figure 3:
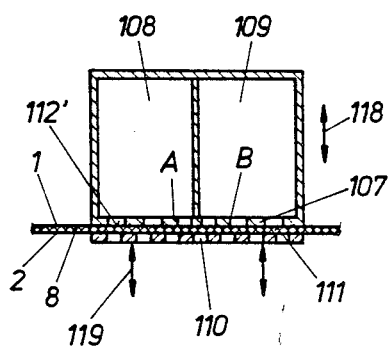
FIG. 3 and 4 are detailed representations of further variants.
Figure 4:
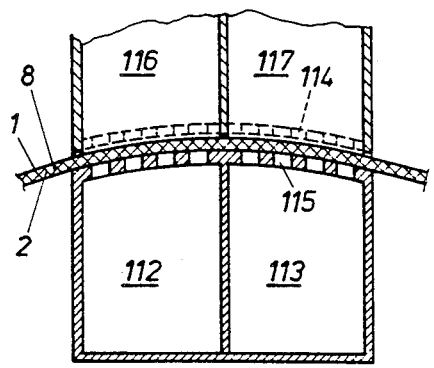

The surfaces A-B, B-C and C-D can be formed as planes, but also curved according to any given function, although care must again be taken to assure a smooth, continuous transition from each pressure chamber underside to the underside of the adjacent pressure chamber. Corresponding variants are shown in partial views in FIG. 3 and 4. FIG. 3 shows an embodiment with plane underside 107 of the pressure chambers 108, 109, FIG. 4 shows two further variants, one with pressure chambers 112, 113 on the underside of the foraminous belts or wires 1,2 with convex upper side 115, the other—shown in dotted lines—with concave underside 114 of the upper chamber 116, 117. In the case of plane faces 107 of the side of the pressure chambers 108, 109 facing the conveying means 1, 2, adjustable perforated pressure plates 110 are associated with these chambers on the side opposite the fibrous board 8 for the purpose of tightly pressing the conveying means and the forming board of fibrous material against the pressure chamber(s) 108, 109 provided on the other side of the fibrous board, the face 111 of said pressure plates facing the fibrous board being adapted to the side 112' of said chambers facing said board, thus being flat or plane in this case. The pressure chambers 108, 109 themselves may be adjustable according to the double arrow 118. The double arrows 119 illustrate the adjusting possibility of the counterplate 110. In the variant according to FIG. 4, the lower chambers 112, 113 can be superpressure containers, the chambers 116, 117 can be open containers, optionally with the concave bottoms 114 shown in dotted lines. When using containers whose pressure deviates from atmospheric pressure, the edges of the chambers are again to be well sealed against the abutting or adjacent foraminous belts 2 and 1.

As shown in FIG. 1, the foraminous belts or wires 1,2 pass from the treatment container, optionally via a deflection roller 6', to a, for instance obliquely rising, pressing zone preferably consisting of a plurality of pairs of rollers 9 pressed against each other at high pressure. In the instant case, the pressing zone consists of four pairs of press nips 9 by means of which the cake of pulp or fibrous material can be pressed to about 35 percent of solids. The combination of displacement washing and mechanical pressing is particularly interesting for the washing of CTMP (chemothermomechanical) pulp. Up to now, the washing operation in most CTMP plants has not been optimally accomplished. For an economic and effective bleaching of CTMP pulp, a good washing operation is of great advantage. Wash tests with CTMP pulp of various grades of wood were carried out and a washing effect of 93 to 95.5 percent was determined. The washing effect was calculated as follows:

$$\text{washing effect} = \left(1 - \frac{\text{Na (pulp cake)}}{\text{Na (pulp supply)}}\right) \times 100$$

In the above equation, Na, as usual, means sodium, "pulp cake" means "filter cake" and "pulp supply" means "filter cake supply".

A large collecting vat 10 is provided on the underside of the dehydrating machine. This collecting vat 10 has outlet lines 11 and 13 integrated into the process. The line 11 is connected to line 45 and thus to the filtrate container 42, the line 13 is connected via the pipe 43 with the filtrate container 40. This permits an economic operation. As already mentioned, however, it would also be possible to introduce a foreign treatment medium or additional chemicals, for instance a bleaching agent, into the pressure chambers or pressure zones 26 to 28. The container 28 is supplied via line 17 with fresh, conveniently warm water. Moreover, the system is supplied at 70 with air compressed to about 6 bar. The compressed air is directed (i.e. channeled to the consumption site of the machine) by means of the control panel St, for instance for regulating the foraminous belts or wires 1, 2, in particular their tension, and for use at the pressing sites. Furthermore, pressure pumps 71 to 73 are associated with the containers 26 to 28. Fresh warm water can additionally be supplied via lines 74 to 79 to the filtrate containers 40 and 41 and the belts or wires. The water flowing off the foraminous belts is collected at 80 and 81 and passed to the filtrate container 40 via lines 82 and 84.

The fibrous material or the pulp to be treated is conveyed at 85 via the pipes 86 to the container 87 and then via the pipes 88 to the wedge zone of the twin-wire press. The pulp container 87 is provided with an agitator 89 and a level control 90. The motor 91 drives the lower foraminous belt or wire 2, and thus the twin-wire press, via the roller 3 located on the right-hand side. An S-shaped deflection of the foraminous belts or wires and thus of the filter cake present therebetween can be provided instead of, in front of or on the side of the deflection roller 6' on the right-hand side or behind the pressure containers 26 to 28 by two pressure rollers such as it was previously mentioned for the possible embodiment of the area on the left-hand side or in front of the pressure containers.

The treated material leaves the system at M, having particularly favorable properties obtained in a very economical operation, namely, a displacement washing combined with an appropriate exchange of chemicals and mechanical pressing upstream and downstream. According to the invention, the pressure in the closed containers 26 to 28 and thus of the treatment medium conveyed under pressure from said containers to the foraminous belts or wires and to the forming board of fibrous material within the range of said containers plays a decisive part.

The generating of a pressure difference by means of closed chambers above or below the dilute aqueous suspension of fibers can also be applied in the introductory pressure or wedge zone.

We claim:

1. An improved apparatus for the treatment of a material passed between upper and lower foraminous belts, the material being made to pass between the foraminous belts along at least two treatment containers for a treatment liquid a source of treatment liquid being connected to said treatment containers, at least one of the treatment containers being provided with a wall having orifices on a side of the treatment containers facing the material for applying the treatment liquid to the foraminous belts and the material therebetween, comprising:
    a first of the treatment containers being arranged above the upper foraminous belt in contact with the same, said treatment container being formed as a pressure container;
    means for maintaining pressure of the interior of said first treatment container;

said first treatment container being provided with a bottom having orifices facing the upper belt for generating a pressure difference in the upper belt and being otherwise closed against the environment so that the first treatment container dispenses the treatment liquid under superpressure to the upper and lower belts and to the material therebetween;

at least one pressureless collecting container, open to the environment, arranged opposite the first treatment container below the upper foraminous belt;

said at least two treatment containers having side walls and walls facing the foraminous belts, said side walls being arranged immediately side by side, said facing walls being in tight contact with the foraminous belts, said facing walls being, as far as they are located on the same side of the material, continuously merging with one another and thus generating guiding surfaces for the foraminous belts and the material;

an adjustable perforated pressure plate located adjacent the lower belt opposite the first treatment container; and means for adjusting the pressure plate for the purpose of tightly pressing the foraminous belts and the material therebetween against the first treatment container, the face of the pressure plate facing the material being formed plane.

2. The apparatus according to claim 1, including means for adjusting the position of said pressure containers.

3. The apparatus according to claim 2, wherein said means for adjusting is structured for rectilinearly vertically adjusting the position of said pressure containers.

4. An improved apparatus for the treatment of a material passed between upper and lower foraminous belts, the material being made to pass between the foraminous belts along at least two treatment containers for a treatment liquid, a source of treatment liquid being connected to said treatment containers, at least one of the treatment containers closed to the environment having means for sealing walls against the foraminous belts and thus against the material, but otherwise open towards the foraminous belts, comprising:

a first of the treatment containers being arranged above the upper foraminous belt in contact with the same, said treatment container being formed as a pressure container;

means for maintaining pressure of the interior of said first treatment container;

said first treatment container being closed against the environment having means for sealing the walls against the upper belt, but otherwise open towards the upper belt, so the first treatment container dispenses the treatment liquid under superpressure to the upper and lower belts and to the material therebetween;

at least one pressureless collecting container, open to the environment, arranged opposite the first treatment container below the lower foraminous belt;

said at least two treatment containers having side walls and walls facing the foraminous belts, said side walls being arranged immediately side by side, said facing walls being in tight contact with the foraminous belts, said facing walls being, as far as they are located on the same side of the material, continuously merging with one another and thus generating guiding surfaces for the foraminous belts and the material;

an adjustable perforated pressure plate located below the lower belt opposite the first treatment container; and means for adjusting the pressure plate for the purpose of tightly pressing the foraminous belts and the material therebetween against the first treatment container, the face of the pressure plate facing the material being formed plane.

5. The apparatus according to claim 4, including means for adjusting the position of said pressure containers.

6. The apparatus according to claim 5, wherein said means for adjusting is structured for rectilinearly vertically adjusting the position of said pressure containers.

7. An improved apparatus for the treatment of a material passed between upper and lower foraminous belts, the material being made to pass between the foraminous belts along at least two treatment containers for a treatment liquid, a source of treatment liquid being connected to said treatment containers, at least one of the treatment containers closed to the environment having means for sealing walls against the foraminous belts and thus against the material, but otherwise open towards the foraminous belts, comprising:

a first of the treatment containers being arranged adjacent the upper foraminous belt in contact with the same, said treatment container being formed as a pressure container;

means for maintaining pressure of the interior of said first treatment container;

said first treatment container being closed against the environment having means for sealing the walls against the upper belt, but otherwise open towards the upper belt, so the first treatment container dispenses the treatment liquid under superpressure to the upper and lower belts and to the material therebetween;

said at least two treatment containers having side walls and walls facing the foraminous belts, said side walls being arranged immediately side by side, said facing walls being in tight contact with the foraminous belts and said facing walls being formed convexly, said facing walls being, as far as they are located on the same side of the material, continuously merging with one another and thus generating smoothly curving guiding surfaces for the foraminous belts and the material each treatment container has an open pressureless collecting container, open to the environment, arranged below a respective upper treatment container and adjacent the lower foraminous belt, of essentially identical dimensions of horizontal cross sections where they face the foraminous belts;

each open pressureless collecting container has side walls; and each side wall of each treatment container is perpendicularly aligned above a side wall of an open pressureless collecting container; and means for adjusting the position of said pressure containers.

8. The apparatus according to claim 7, wherein the facing walls form a continuously curved foraminous belt contact surface of identical radii of curvature.

9. The apparatus according to claim 7, wherein the means for maintaining pressure of the interior of said pressure containers include a pressure pump for feeding the treatment liquid.

10. The apparatus according to claim 7, wherein:
one side wall of each open pressureless collecting container extends transversely across the moving direction of the foraminous belts.

11. The apparatus according to claim 7 wherein said means for adjusting is structured for rectilinearly vertically adjusting the position of said pressure containers.

12. An improved apparatus for the treatment of a material passed between upper and lower foraminous belts, the material being made to pass between the foraminous belts along at least two treatment containers for a treatment liquid, a source of treatment liquid being separately connected to said treatment containers, said at least two treatment containers closed to the environment having means for sealing walls against the foraminous belts and thus against the material, but being open towards the foraminous belts, comprising:
at least two treatment containers being arranged above the upper foraminous belt in contact with the same, said treatment containers being formed as pressure containers;
means for maintaining pressure of the interior of said at least two treatment containers, said means for maintaining pressure being separately connected to said treatment containers;
said at least two treatment containers being closed against the environment having means for sealing the walls against the upper belt, but otherwise open towards the upper belt, so that said at least two treatment containers dispense the treatment liquid under superpressure to the upper and lower belt and to the material therebetween;
said at least two treatment containers having side walls and bottoms facing the foraminous belts, said side walls being arranged immediately side by side, said bottoms being in tight contact with the foraminous belts, said bottoms having orifices facing the upper belt and said bottoms being formed convexly, said bottoms being, as far as they are located on the same side of the material, continuously merging with one another and thus generating smoothly curving guiding surfaces for the foraminous belts and the material each treatment container has an open pressureless collecting container, open to the environment, arranged below a respective upper treatment container and adjacent the lower foraminous belt, of essentially identical dimensions of horizontal cross sections where they face the foraminous belts;
each open pressureless collecting container has side walls; and
each side wall of each treatment container is perpendicularly aligned above a side wall of an open pressureless collecting container; and means for adjusting the position of said pressure containers.

13. The apparatus according to claim 12, wherein the facing walls form a continuously curved foraminous belt contact surface of identical radii of curvature.

14. The apparatus according to claim 12, wherein the means for maintaining pressure of the interior of said pressure containers include a pressure pump for feeding the treatment liquid.

15. The apparatus according to claim 12, wherein:
one side wall of each open pressureless collecting container extends transversely across the moving direction of the foraminous belts.

16. The apparatus according to claim 13, wherein said means for adjusting is structured for rectilinearly vertically adjusting the position of said pressure containers.

* * * * *